(12) United States Patent
Lamoine et al.

(10) Patent No.: US 7,803,299 B2
(45) Date of Patent: Sep. 28, 2010

(54) EXTRUDED RUBBER PROFILE, METHOD FOR OBTAINING SAME AND TIRE INCORPORATING SAME

(75) Inventors: Philippe Lamoine, Clermont-Ferrand (FR); Jean-Marie Micouin, Chatel-Guyon (FR)

(73) Assignee: Michelin-Recherche et Technique S.A., Granges-Paccot (CH)

( * ) Notice: Subject to any disclaimer, the term of this patent is extended or adjusted under 35 U.S.C. 154(b) by 1152 days.

(21) Appl. No.: 11/430,820

(22) Filed: May 10, 2006

(65) Prior Publication Data

US 2006/0202378 A1    Sep. 14, 2006

Related U.S. Application Data

(60) Division of application No. 10/763,180, filed on Jan. 26, 2004, now abandoned, which is a continuation of application No. PCT/EP02/08417, filed on Jul. 29, 2002.

(30) Foreign Application Priority Data

Jul. 30, 2001    (FR)    ................... 01 10215

(51) Int. Cl.
*B29C 47/06* (2006.01)
*B29C 47/56* (2006.01)
*B60C 1/00* (2006.01)
*B60C 11/00* (2006.01)
*B60C 19/08* (2006.01)

(52) U.S. Cl. ............... 264/173.12; 152/152.1; 152/209.5; 152/DIG. 2; 264/174.11; 425/131.1; 428/377; 428/493

(58) Field of Classification Search .......... 152/152.1, 152/209.5, DIG. 2; 425/131.1; 428/364, 428/377, 493; 264/75, 173.12, 173.17, 173.18, 264/174.11
See application file for complete search history.

(56) References Cited

U.S. PATENT DOCUMENTS 2,138,378 A * 11/1938 Johnson ............ 425/131.1

(Continued)

FOREIGN PATENT DOCUMENTS

DE         10014892     * 10/2001

(Continued)

OTHER PUBLICATIONS

Machine translation for Japan 2000-185519 (no date).*

(Continued)

*Primary Examiner*—Steven D Maki
(74) *Attorney, Agent, or Firm*—Buchanan Ingersoll & Rooney PC

(57) ABSTRACT

An extruded profiled element, based on a cross-linkable rubber composition, is delimited in width by two lateral faces which connect radially inner and outer faces to one another for the tread. A conducting element is provided in the profiled element to connect the inner face electrically to the outer face between the lateral faces and all along the length of the profiled element. The remainder of the profiled element is based on an electrically insulating material. When the profiled element is viewed in cross-section, the conducting element has a layered structure including electrically conducting layers which are essentially concentric and which have a curvature towards at least one of the inner and outer faces, with at least one of the layers emerging at the surface of the outer face.

3 Claims, 8 Drawing Sheets

U.S. PATENT DOCUMENTS

| | | | | | |
|---|---|---|---|---|---|
| 2,174,779 | A | * | 10/1939 | Delorme | 425/131.1 |
| 5,118,745 | A | * | 6/1992 | Motogami et al. | 524/377 |
| 6,075,092 | A | | 6/2000 | Nakamura et al. | |
| 6,294,119 | B1 | * | 9/2001 | Nakamura | 264/173.12 |
| 6,399,692 | B2 | * | 6/2002 | Hogan et al. | 152/DIG. 2 |

FOREIGN PATENT DOCUMENTS

| | | |
|---|---|---|
| EP | 0 735 088 | 1/1999 |
| EP | 0 925 903 | 6/1999 |
| EP | 1 103 391 | 5/2001 |
| EP | 0 810 258 | 10/2001 |
| JP | 62-198433 * | 9/1987 |
| JP | 10-237223 * | 9/1998 |
| JP | 11-227415 | 8/1999 |
| JP | 2000-185519 * | 7/2000 |
| WO | WO 99/28376 | 6/1999 |
| WO | WO 00/27655 | 5/2000 |

OTHER PUBLICATIONS

Machine translation for German 10014892 (no date).*

* cited by examiner

US 7,803,299 B2

EXTRUDED RUBBER PROFILE, METHOD FOR OBTAINING SAME AND TIRE INCORPORATING SAME

This application is a divisional of U.S. Ser. No. 10/763,180 filed on Jan. 26, 2004, now abandoned which is a continuation of PCT/EP02/08417 filed on Jul. 29, 2002, and which claims priority from Patent Application Serial No. 01/10215 filed in France on Jul. 30, 2001.

FIELD OF THE INVENTION

The present invention concerns an extruded profiled element consisting of a cross-linkable rubber composition, a process for obtaining the said profiled element, a tire tread based on the said extruded and cross-linked profiled element, and a tire comprising the said tread.

BACKGROUND OF THE INVENTION

The invention is of use in particular to ensure the proper operation of electronic equipment fitted in a vehicle provided with such tires, particularly a vehicle of the passenger car type. Thus, the invention is useful, for example, in ensuring the reception quality of radio waves by a radio provided within such a vehicle, and/or the reliability of an electronic device provided inside a vehicle or a tire fitted on the vehicle.

As is known, a vehicle's tires become charged and are discharged by virtue of a triboelectric effect during rolling, and in certain meteorological conditions the corresponding charge and discharge sometimes interfere via electromagnetic perturbations with electronic equipment fitted in the vehicle, for example with an on-board radio, and more particularly when the said radio is used in the amplitude modulation mode.

Notably, when moving from a first rolling stretch to a second rolling stretch after it which has physical characteristics different from those of the first stretch, for example different electric conductivity and/or structure and/or relief, there is a sudden discharge from the tread of each tire, of the charge accumulated along the said first stretch.

Such successive rolling stretches can for example consist respectively of an electrically insulating material, such as asphalt, and an electrically conducting material such as that used for the metallic junctures of a bridge, for manhole covers, or for train rails.

It is also known that when changing from rolling on a given first stretch to a given second stretch, the sudden discharges and the electromagnetic perturbations resulting from them are the more marked, in particular the more electrically insulating is the material constituting the tread.

Now, many tires in current use are characterized by a high content of reinforcing filler which is not electrically conductive, such as silica, the advantageous effect of this being to reduce hysteresis losses during rolling and consequently to decrease the rolling resistance of the tires, so that the fuel consumption of the corresponding vehicles also reduced.

A disadvantage of such tires lies in the relatively high resistivity of the tread material, whose effect is sometimes to generate the said electromagnetic perturbations in certain meteorological conditions.

The document of Japanese patent JP-A-10 237223 discloses a tire tread composition with low electrical resistivity, which contains essentially a diene elastomer, silica, and an alkali or alkali-earth metal salt such as lithium perchlorate, this salt being solvated by a diester-based compound such as a diester of adipic acid.

The document of U.S. Pat. No. 6,075,092 discloses a rubber composition with improved hysteresis and service properties, as well as anti-static properties. This composition comprises silica and a polyether consisting of a terpolymer of ethylene oxide, propylene oxide and an unsaturated epoxide such as epichlorohydrin.

The document of European patent EP-A-925 903 discloses an automobile tire designed in particular to enable the electrostatic charge on the vehicle body to be discharged to the ground over which the vehicle is rolling.

For that purpose, the tread of the said tire has all the way round its circumference and emerging on its radially outer surface a radial strip with high electrical conductivity based on a rubber composition reinforced with carbon black, the remainder of the tread being based on another rubber composition whose electrical conductivity is low.

This tread is obtained in the unvulcanized condition by extruding the two rubber compositions in parallel in two separate extruders, and bringing the two compositions that emerge from the said extruders into contact at the downstream end of an extrusion head common to the two extruders, to obtain at the outlet of the said head an extrudate containing the said radial strip within the tread.

Note that the tread obtained only enables the electrostatic charge on the vehicle body to be discharged to the ground, but does not reduce radio interference, for example when rolling over a metal plate.

The document of International patent WO-A-00/27655 in the name of the applicant discloses a tire which minimizes the power of the electrostatic discharges from the tread when moving from a first rolling stretch to a second one with different physical characteristics.

The tire described in that document has a tread comprising on its circumference at least one electrically conducting layer which essentially connects the lateral faces of the said tread to one another, the said layer having higher conductivity than that of the remainder of the tread.

A purpose of the present invention is to propose an extruded profiled element based on a cross-linkable rubber composition, the said profiled element being intended to constitute a tire tread in the cross-linked condition and being delimited in width by two lateral faces which, between them, connect radially inner and outer faces of the said tread, with conducting means provided in the said profiled element to connect the said inner face electrically to the said outer face between the said lateral faces and along the length of the said profiled element, the remainder of the profiled element being based on an electrically insulating material, which again enables the power of the electrostatic discharges from the said tread when rolling on the said successive stretches, and hence the aforesaid electrostatic perturbations, to be minimized.

To that end, an extruded profiled element according to the invention is such that the said conducting means, viewed in a cross-section of the said profiled element, have a layered structure comprising electrically conducting layers which are essentially concentric and are curved in the direction of at least one of the said inner and outer faces, with at least one of the said layers emerging at the surface of the said outer face.

When used in a set of tires fitted to a vehicle with an on-board radio receiver, this layered tread structure results in particular in a significant reduction of the radio interferences that can be perceived in the amplitude modulation mode when rolling on electrically conductive road elements in certain meteorological conditions, and this even when the said tires are substantially worn.

According to one example embodiment of the invention, the said electrically conducting layers, viewed in a cross-section of the said profiled element, describe a plurality of turns essentially around the longitudinal axis of symmetry of the said profiled element.

In an embodiment of the invention, the said electrically conducting layers are globally wound in a spiral around the said longitudinal axis.

According to another characteristic of this embodiment, along the length of the said profiled element the electrically conducting layers have a filament shape comprising a plurality of helicoidal filaments centered on the said axis of symmetry.

More precisely, along the said profiled element this filamentation comprises a succession of identical sections $T_i$ (i=1 to n) each consisting of a plurality of conical filaments $F_j$ (j=1 to m) inscribed on cone sections essentially parallel to one another and centered on the said axis of symmetry.

In a known way, conical filament means a helicoidal filament inscribed on a cone section, i.e. rolled in a conical spiral on the outer surface of a truncated cone.

Moreover, each conical filament $F_j$ of each of the said sections $T_i$ is inscribed on a cone section that converges towards the inside of the cone section on which the same conical filament $F_j$ of an immediately consecutive section $T_{i+1}$ is inscribed.

Advantageously, in a cross-section of the said profiled element the said layers can have essentially the shape of an arc of a flattened ellipse whose major axis corresponds to the transverse direction of the said profiled element.

Preferably, the said electrically conducting layers, viewed in cross-section in the said profiled element, describe a number of turns between 30 and 70 and, more preferably still, between 40 and 60. Each of the conducting layers then has a thickness essentially between 0.05 and 0.15 mm.

According to an example embodiment of the invention, at least one of the said electrically conducting layers emerges at the surface of one or of each of the lateral faces of the said profiled element.

Note that these on the surface of the lateral faces, as also the aforesaid points of emergence on the surface of the outer face of the profiled element, can advantageously allow colour contrasts or shades to be formed on the tire tread consisting of the profiled element, for example when a colored rubber composition is used for the said insulating material.

According to a preferred embodiment of the invention, the said conducting means also comprise a conducting film at the position of one or of each lateral face of the said profiled element.

This or these conducting film(s) further minimize(s) the power of the aforesaid electrostatic discharges and so too, therefore, the resultant radio interference.

According to a first example embodiment of the invention, the said electrically conducting layers consist of a rubber composition based on at least one diene elastomer, containing carbon black as the reinforcing filler and having an electrical resistivity lower than $10^8$–$\Omega$·cm, for example between $10^4$ and $10^5$ $\Omega$·cm, the resistivity of the said insulating material necessarily being above $10^8$ or $10^9$ $\Omega$·cm. The proportion of carbon black in this composition is determined as a function of the resistivity desired.

Suitable carbon blacks are any of those conventionally used in tires and especially in tire treads, in particular carbon blacks of the HAF, ISAF or SAF type. As non-limiting examples of such carbon blacks, N115, N134, N234, N339, N347 and N375 can be mentioned.

According to a second example embodiment of the invention, the said electrically conducting layers consist of a rubber composition based on at least one diene elastomer, comprising an inorganic reinforcing filler and a conducting ionic solution comprising:

a polyether which is a copolymer of oxyethylene and oxypropylene with a majority of oxyethylene units,
an ionic salt of a monovalent or divalent metal, such as lithium perchlorate or zinc dichloride, and
a polar solvent such as polypropylene glycol carbonate.

Note that in this case the said conducting layers comprise an electrolyte solution that imparts to them ionic conduction properties (by virtue of the migration of ionic charges), in contrast to rubber compositions with a carbon black filler, which are characterized by electronic conduction (by electron drift). The electrical resistivity of such conducting layers can range from $10^6$ to $10^9$ $\Omega$·cm.

The diene elastomer used can be any homopolymer or copolymer obtained by polymerisation of a conjugated diene monomer having 4 to 12 carbon atoms, or several such diene monomers conjugated together, or else one or more such diene monomers conjugated with one or more vinylaromatic compounds each having 8 to 20 carbon atoms.

Suitable conjugated diene monomers are in particular butadiene-1,3, 2-methyl-1,3-butadiene, the 2,3-di(alkyl with C1 to C5)-1,3-butadienes such as 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene, or 2,4-hexadiene.

Suitable vinylaromatic compounds are for example styrene, ortho-, meta- and para-methylstyrene, the commercial mixture "vinyltoluene", para-tertiobutylstyrene, or divinylbenzene. Note that styrene is used for preference.

Preferably, butadiene-1,3 and/or isoprene is/are used as the conjugated diene(s) and styrene as the vinylaromatic monomer, to obtain butadiene/isoprene, styrene/butadiene, styrene/isoprene, or butadiene/styrene/isoprene copolymers.

The polyether that can be used according to the invention has a high inherent viscosity which, measured at 25° C. in toluene, is greater than 4 dl/g and preferably between 4 and 8_dl/g.

More preferably still, this polyether contains oxyethylene units in a mole fraction between 85 and 95%, and oxypropylene units in a mole fraction between 5 and 15%.

The polyether can be used in the said rubber composition for the conducting layers, in an amount ranging between 20 and 50 phr (phr: parts by weight per 100 parts of the elastomer(s)).

The ionic salt of a monovalent metal used can for example be a salt of lithium, sodium, potassium, caesium or silver.

The ionic salt of a divalent metal used can for example be a salt of magnesium, calcium, copper or zinc.

For example, the following anions can be used with the cations of the aforesaid metals:

$Cl^-$, $Br^-$, $I^-$, $NO_3^-$, $SCN^-$, $ClO_4^-$, $CF_3SO_3^-$.

The ionic salt can be used in the said rubber composition in an amount between 5 and 30 phr depending on the salt used, and preferably between 10 and 20 phr.

As is known, "inorganic filler" means an inorganic or mineral filler, whatever its colour and origin (natural or synthesised), also known as a white filler or sometimes a light filler as opposed to carbon black.

Again in a known way, "inorganic reinforcing filler" means an inorganic filler capable, on its own and without any other means than an intermediate coupling agent, of reinforcing a rubber composition intended for the production of tyres, in other words capable of replacing in its reinforcing function a conventional filler of tyre-grade carbon black.

For the inorganic reinforcing filler, for example any reinforcing silica among the ones familiar to those with knowledge of the field can be used, in particular any precipitated silica with a BET area and a CTAB specific surface area both below 450 m$^2$/g, although the highly dispersible precipitated silicas are preferred (the BET specific surface area being determined in a known way in accordance with the Brunauer-Emmett-Teller method described in "Journal of the American Chemical Society", Vol. 60, page 309, February 1938 and corresponding to the standard AFNOR-NFT45007 (November 1987), and the CTAB specific surface area being the external surface area determined in accordance with the same standard AFNOR-NFT45007 of November 1981).

More preferably still, the silica used has BET or CTAB specific surface areas both ranging between 80 m$^2$/g and 260 m$^2$/g.

"Highly dispersible silica" means a silica with a very pronounced ability to disagglomerate and become dispersed in an elastomer matrix, as observed in a known way by electron or optical microscopy of thin sections.

As non-limiting examples of such highly dispersible silicas that are preferred, the following can be mentioned: Perkasil KS 430 silica available from AKZO, BV 3380 silica available from Degussa, Zeosil 1165 MP and 1115 MP silicas from Rhodia, Hi-Sil 2000 from PPG, Zeopol 8741 or 8745 silicas from Huber, or treated precipitated silicas such as the silicas "doped" with aluminium described in patent application EP-A-0 735 088.

Of course, inorganic reinforcing filler can also mean mixtures of inorganic reinforcing fillers, in particular of highly dispersible silicas such as those described above.

In a non-limiting way, it is also possible to use aluminas (of formula $Al_2O_3$) such as the highly dispersible aluminas described in European patent document EP-A-810 258, or aluminium hydroxydes such as those described in International patent document WO-A-99/28376.

The process according to the invention for obtaining the aforesaid extruded profiled element consists in the following:
- on the one hand, the said electrically insulating tread material is introduced into an inlet of a main extruder which opens coaxially into an extrusion head, and on the other hand, the said electrically conducting material intended to constitute the said conducting means with a layered structure is introduced into an inlet of at least one satellite extruder which opens radially upstream from the said extrusion head inside the said main extruder,
- the insulating material and the conducting material are propelled through the extruders,
- inside the said main extruder and upstream from the said extrusion head, a uniformly distributed mixture of the said insulating material and the said conducting material is produced, the mass fraction of the said insulating material being equal to or greater than 80% and that of the said conducting material being less than or equal to 20% in the said mixture, and
- the said mixture is passed into a channel of the said extrusion head to obtain, at the outlet of an extrusion orifice of the said extrusion head, the extruded and cross-linkable profiled element for the tread.

Note that the diameter of the orifice via which the satellite extruder communicates with the main extruder, and the respective feed flow rates of insulating material and conducting material into these extruders, determine the degree of homogenisation of the mixture obtained and the geometry of the layered structure formed in the extruded profiled element.

According to another characteristic of the invention, the temperature inside each extruder is between 70 and 90° C.

According to a further characteristic of the invention, the absolute pressure inside the said extrusion head is between 20 and 30 bars.

Note that this process according to the invention can be implemented by positioning the satellite extruder at a variable distance upstream from the extrusion head, as a function of the dimensional characteristics desired for the layered structure of conducting means to be formed in the extruded profiled element (for example, the number of turns of the spiral obtained and/or their thickness).

To do this, a plurality of orifices can be provided along the main extruder for its communication with the satellite extruder, the orifices not used for this being of course blocked.

It should also be noted that this process according to the invention is not limited to the production, inside the said main extruder and upstream from the said extrusion head, of a uniformly distributed mixture consisting of the insulating material and just one conducting material. For example, it would be possible to mix the insulating material with several conducting materials by means of a plurality of satellite extruders respectively intended to extrude these conducting materials and each opening radially within the main extruder, in all cases upstream from the extrusion head.

Note also that the extruded profiled element obtained according to the invention can be split (i.e. the profiled element can be divided in the direction of its length), for example if it were desired to obtain particular coloured designs at the positions of the lateral faces of the tread.

A cross-linkable or cross-linked tyre tread according to the invention is one that consists of the extruded profiled element defined above, and a tyre according to an embodiment of the invention is one that comprises the said tread in the cross-linked condition.

A second aspect of the invention is to propose a cross-linkable or cross-linked tyre tread delimited at the sides by two lateral faces that connect together the radially inside and outside faces, the said tread being based on an electrically insulating material and comprising at its circumference at least one axial conducting layer which essentially connects the said lateral faces together and which has a resistivity lower than that of the said insulating material, this being provided radially on both sides of the said layer in the said tread, which also allows the power of the electrostatic discharges from the tread when rolling on the aforesaid successive stretches, and hence the resultant electrostatic disturbances, to be minimized.

The tread according to this second aspect of the invention is such that the said axial conducting layer consists of a rubber composition such as that described above with reference to the first example embodiment of electrically conducting layers that form the layered structure according to the invention. This composition is thus based on a diene elastomer and comprises an inorganic reinforcing filler and an ionic solution comprising a polyether (copolymer of oxyethylene and oxypropylene with a majority of oxyethylene units), an ionic salt of a monovalent or divalent metal, such as lithium perchlorate or zinc dichloride, and a polar solvent, such as polypropylene glycol, in the quantities indicated previously.

Reference should be made to what was said earlier (including the quantities in phr) for a detailed description of the diene elastomer(s), the inorganic reinforcing filler and the conducting ionic solution that can be used to obtain the said axial conducting layer.

In particular, when used for a set of tyres fitted to a vehicle with an on-board radio receiver, this tread significantly reduces the radio interference that can be perceived in amplitude modulation mode in certain meteorological conditions when rolling over electrically conducting road elements.

Advantageously, the tread according to this second aspect of the invention also comprises a conducting film at the position of one or both lateral faces, which connects the said inner and outer faces electrically to one another.

The conducting film(s) enable(s) the power of the aforesaid electrostatic discharges and consequently the resulting radio interferences to be minimised still further.

DESCRIPTION OF THE DRAWINGS

The aforesaid characteristics of the present invention, and others as well, will be better understood on reading the following description of an example embodiment of the invention, presented for illustrative and not limiting purposes, the said description referring to the attached drawings, which show:

FIG. 1b: Schematic perspective view of part of an extruded profiled element according to an example embodiment of the invention, which can be used in the tread of FIG. 1a;

DESCRIPTION OF PREFERRED EMBODIMENTS OF THE INVENTION

Figure 1A:
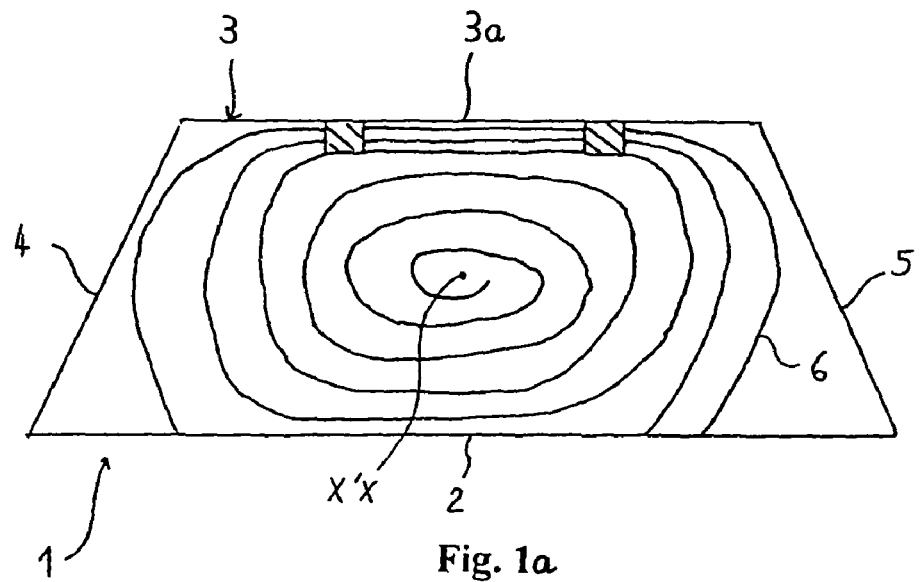
FIG. 1a: Schematic radial cross-section of a tread according to an embodiment of the invention

The tread 1 represented in FIG. 1a is shown with an essentially trapezoidal radial cross-section solely for the sake of simplification. As can be understood, it could have any form deemed appropriate, including the tread pattern, for the type of tire chosen.

This tread 1 is delimited by a radially inner face 2 intended to be positioned against various reinforcements of a tyre (not shown), a radially outer face 3 on which are formed tread patterns 3a and which is intended to evolve in contact with the ground during rolling, and two lateral faces 4 and 5 which connect the two faces 2 and 3 together.

The tread 1 is based on an electrically insulating material, for example containing a non-conducting filler such as silica. As can be seen in FIG. 1a, in cross-section the tread 1 has electrically conducting layers 6 which describe a plurality of turns essentially around the longitudinal axis of symmetry X'X of the said tread 1.

In the example of FIG. 1a, these conducting layers 6 are globally wound in a spiral around the said axis X'X and have a cross-section in the shape of an arc of a flattened ellipse whose major axis corresponds to the transverse direction of the tread 1.

Figure 1B:
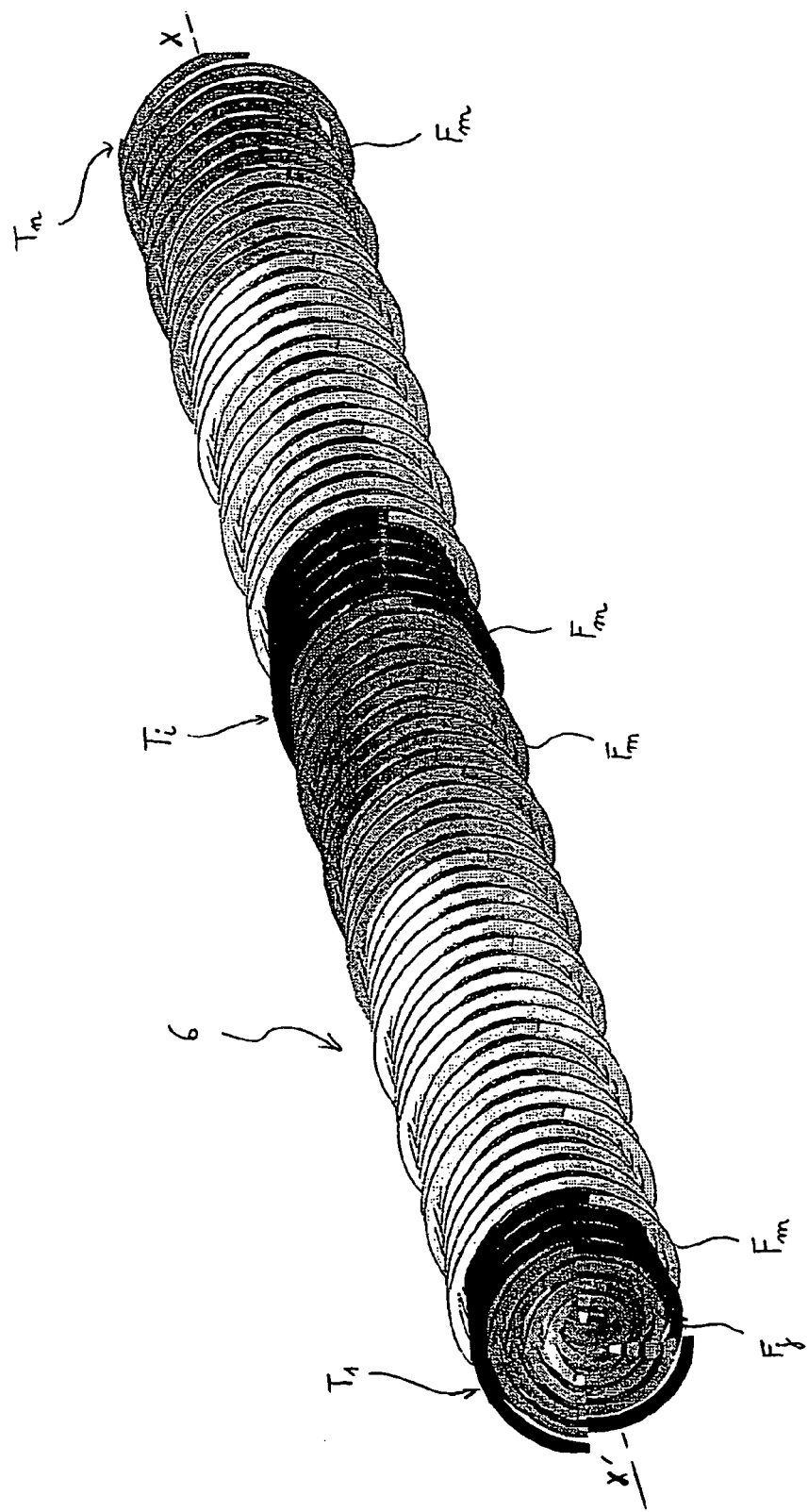
Figure 1C:
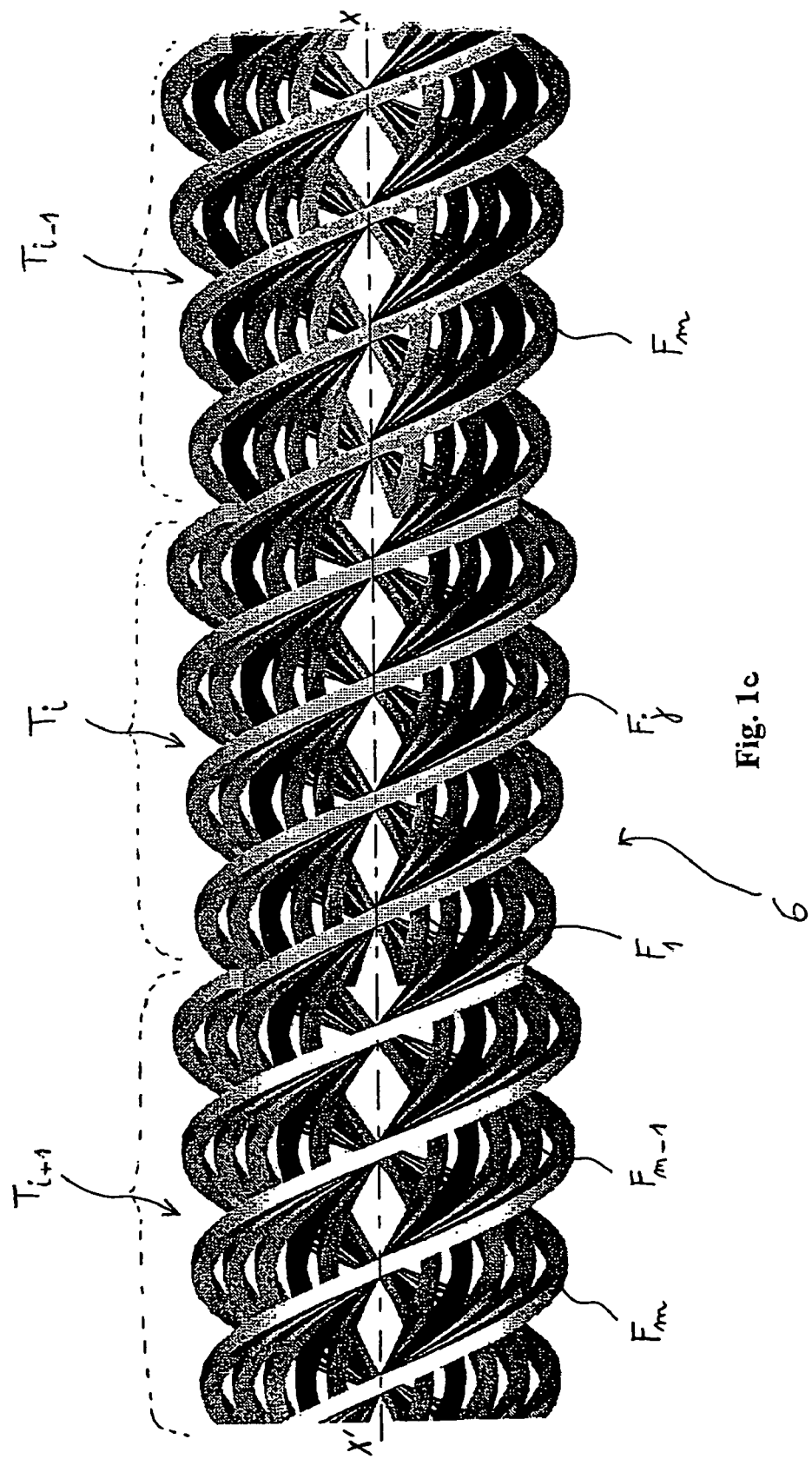
FIG. 1c: Side view of a detail of the said part of the extruded profiled element shown in FIG. 1b.

FIGS. 1b and 1c illustrate schematically the filamentary shape of these electrically conducting layers 6 in the longitudinal direction of the tread 1.

These figures show that the filamentation comprises a succession of identical sections $T_i$ (I=1 to n) each consisting of the same number of conical filaments $F_j$ (j=1 to m) inscribed on cone sections substantially parallel to one another and centred on the said axis X'X (three consecutive sections $T_{i-1}$, $T_i$ and $T_{i+1}$ are identified with dotted brackets in FIG. 1c).

FIG. 1c shows that each conical filament $F_j$ of each section $T_i$ is inscribed on a cone section that converges towards the inside of the cone section on which the same conical filament $F_j$ is inscribed (i.e. corresponding to the same turn of rank j) of an immediately consecutive section $T_{i+1}$.

This "nesting" of conical filaments $F_j$ can also be seen in FIG. 1b, which shows in particular the outermost conical filament $F_m$ of each section $T_j$ which is inscribed on a cone section converging towards the inside of the cone section on which is inscribed the outermost conical filament $F_m$ of the adjacent section $T_{i+1}$.

Note that FIGS. 1a, 1b and 1c in no way limit the scope of the invention in relation to the number of turns, sections and helicoidal filaments present in the conducting layers 6. Only for simplification purposes and for the sake of clarity has it been chosen to represent in these figures a relatively small number of such turns, sections and filaments.

Figure 2:
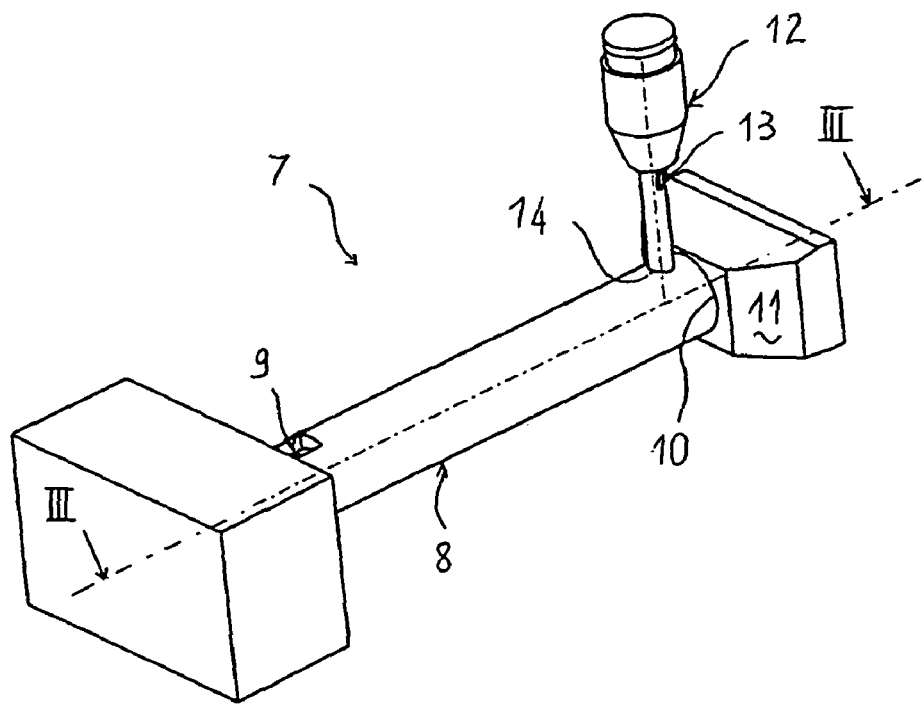
FIG. 2: Schematic perspective view of an extrusion device for implementing the process according to the invention.

The extrusion device 7 shown in FIG. 2 is designed to produce extruded profiled elements intended, in the cross-linked condition, to constitute treads 1 each comprising the conducting layers 6 with their layered structure.

The device 7 consists of a main extruder 8 designed to receive the said insulating material of the tread 1 via an inlet 9, and which comprises an outlet 10 opening coaxially into an extrusion head 11, and a satellite extruder 12 designed to receive a material intended to constitute the said conducting layers 6 via an inlet 13, and which comprises an outlet 14 opening radially inside the main extruder 8, upstream from the extrusion head 11.

Figure 3:
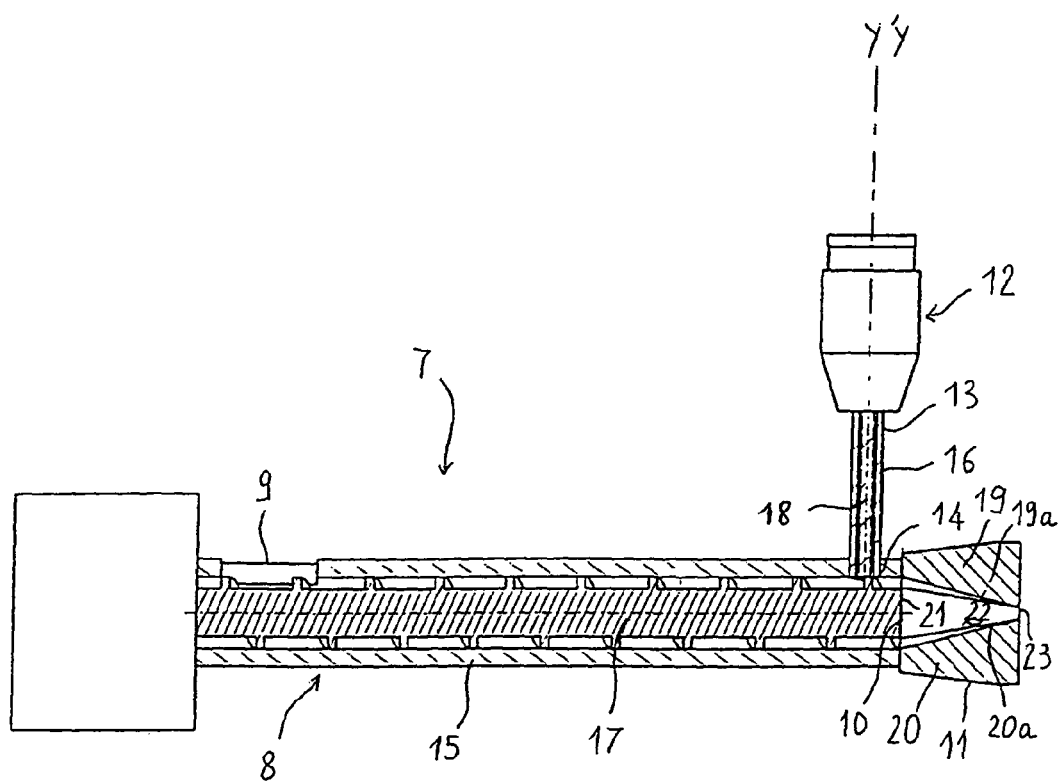
FIG. 3: Schematic cross-section through the plane III-III in FIG. 2 of the said extrusion device.

The respective structures of the extruders 8, 12 and of the extrusion head 11 are shown in FIG. 3. Each extruder 8,12 consists of a cylindrical sleeve 15, 16 within which rotates an Archimedian screw 17, 18.

The extrusion head 11 comprises an upper vault 19 and a lower vault 20 which, from the inlet 21 to the said extrusion head 11, delimit a flow channel 22 which leads to an extrusion orifice 23 of an extrusion blade (not shown), through which the extruded profiled elements are pushed. The extrusion orifice 23 is delimited by walls 19a and 20a respectively attached to the vaults 19 and 20.

In the example embodiment of FIG. 3 the extrusion head 11 is of the "roller die" type, characterised in that the wall 19a of the extrusion blade is fixed, while the other wall 20a is mobile and is constituted by the outer surface of a roller (not shown).

It will be understood that the present invention is not limited to the use of an extrusion head 11 of this type, since an extrusion head of the "flat die" type could also be used, in which both walls 19a and 20a of the extrusion orifice 23 are fixed.

Below, a particular mode of operation will be described for operating the extrusion device 7 to obtain profiled elements for treads 1 according to an example embodiment of the invention. The extrusion device 7 used has the following dimensional characteristics.

The inside diameter of the sleeve 15 of the main extruder 8 is 60 mm and the Archimedian screw 17 it contains has three spirals. The inside diameter of the sleeve 16 of the satellite extruder 12 is 15 mm, and the Archimedian screw 18 it contains has only one spiral.

The satellite extruder 12 is positioned so that its extrusion axis Y'Y is located 30 mm upstream from the inlet 21 to the extrusion head 11. The extrusion head 11, of the "roller die" type, has a width of 200 mm.

The said insulating material and the said conducting material are introduced continuously, respectively into the inlets 9 and 13 of the extruders 8 and 12, at feed flow rates of 600 g/minute for the main extruder 8 and 30 g/minute for the satellite extruder 12.

In this example embodiment the insulating material "MI" used has a resistivity between $10^{14}$ and $10^{15}$ Ω·cm (see FIG. 6), and consists of a cross-linkable rubber composition such as that constituting the treads of tyres denoted "MXT", i.e. ones that comprise essentially:

- as the elastomer matrix, a blend of a styrene-butadiene copolymer prepared in solution (S-SBR) and a polybutadiene (BR),
- as the reinforcing filler, 80 phr (parts by weight per 100 parts of the elastomers) of a highly dispersible silica marketed by the company Rhodia under the name "ZEOSIL 1165 MP", and
- 30 phr of an added aromatic oil.

As for the said conducting material, this has electrical resistivity lower than $10^8$ Ω·cm and more precisely close to $10^5$ Ω·cm, and consists in this case of a cross-linkable rubber composition containing essentially (without any added aromatic oil):

- as the elastomer matrix, a S-SBR/BR blend, and
- as the reinforcing filler, 60 phr of "N234" carbon black.

The rubber compositions respectively constituting the insulating and the conducting materials are prepared using known processes in which their constituents are worked together thermo-mechanically in one or more stages. For example, they can be obtained by working together thermo-mechanically in one stage in an internal mixer for 3 to 7 minutes, at a blade rotation speed of 50 turns per minute, or in two stages in an internal mixer, the stages lasting for 3 to 5 minutes and 2 to 4 minutes respectively, followed by a finishing stage at about 80° C. during which the sulphur and the vulcanisation accelerators are incorporated.

The temperatures used in the extruders 8, 12 are between 70 and 90° C.

The absolute pressure inside the extrusion head 11 is 24 bars.

The insulating and conducting materials are each propelled by the screws 17 and 18 towards the respective outlets 10 and 14 of the extruders 8 and 12, and are then mixed with one another and homogenised by the screw 17 within the section of the main extruder 8 located between the said axis Y'Y and the outlet 10 of the said extruder 8.

After the mixture so obtained has passed at the aforesaid pressure through the channel 22 of the extrusion head 11, at the outlet from the extrusion orifice 23 a cross-linkable profiled element for a tread 1 is obtained, which has the following characteristics.

The profiled element has the conducting layers 6 described earlier with reference to FIGS. 1a, 1b and 1c, which form about 50 turns around the said axis X'X in a cross-section of the said profiled element. The average thickness of the conducting layers 6 so obtained is essentially equal to one-tenth of a millimeter.

Note that the mass fraction of the insulating material in the profiled element obtained is about 90% and that of the conducting material is about 10%.

There follow the classical stages of building up the tyre of the invention and curing it by sulphur cross-linking, each tread of the said tyres consisting of the said profiled element in the vulcanised condition. The tyres according to the invention so obtained are of size 175/70 R14 and are denoted as "MXT" tires.

Note that the conducting layers 6 are present in the aforesaid form in the cross-linked tread.

A first and second series of tests to compare radio interference while rolling were carried out using sets of new tyres for the first series and, for the second series, tyres with a degree of wear corresponding to the disappearance of half the thickness of the tread (i.e. the radial dimension of the tread was reduced by half over its entire axial dimension).

Each of these two series of radio interference tests consisted in quantifying the radio interferences perceived in the amplitude modulation mode during the rolling of a test vehicle fitted successively with these sets of tyres, quantification taking place by the amplification and analysis of the corresponding signals recorded from the loudspeaker of an on-board radio receiver in the vehicle. The electrostatic discharge was measured during the passage of each set of tyres over a given stretch of road, by recording the voltage variation of the loudspeaker.

The first test series was carried out under the same meteorological conditions (temperature: 17° C., outside air humidity: 18%, dew-point temperature of the outside air: −7° C.) and under the same rolling conditions (road stretches comprising circular manhole covers of the same diameter essentially equal to 66 cm, and at a constant rolling speed equal to 70 km/h. i.e. defining for the vehicle a passage time over each manhole cover of about 34 milliseconds).

In addition, for the on-board radio receiver in the vehicle a reception frequency of 1386 kHz was used, corresponding to amplitude modulation and with the same amplification of the signal emerging from the radio receiver in all the tests.

For the first test series, the following sets of tyres were used:

A set No. 1 of control "175/70 R14 MXT" tyres in the new condition, each having a tread that consisted exclusively of the said "MI" insulating material with resistivity between $10^{14}$ and $10^{15}$ Ω·cm, i.e. based on a S-SBR/BR blend with 30 phr of added aromatic oil and 80 phr of "ZEOSIL 1165 MP" silica.

A set No. 2 of new control tyres, of size 175/70 R14 each comprising a tread 101 based on the same "MI" insulating material with a conducting axial layer 110 about 0.5 mm thick connecting the lateral faces 104 and 105 of the tread to one another.

Figure 4:
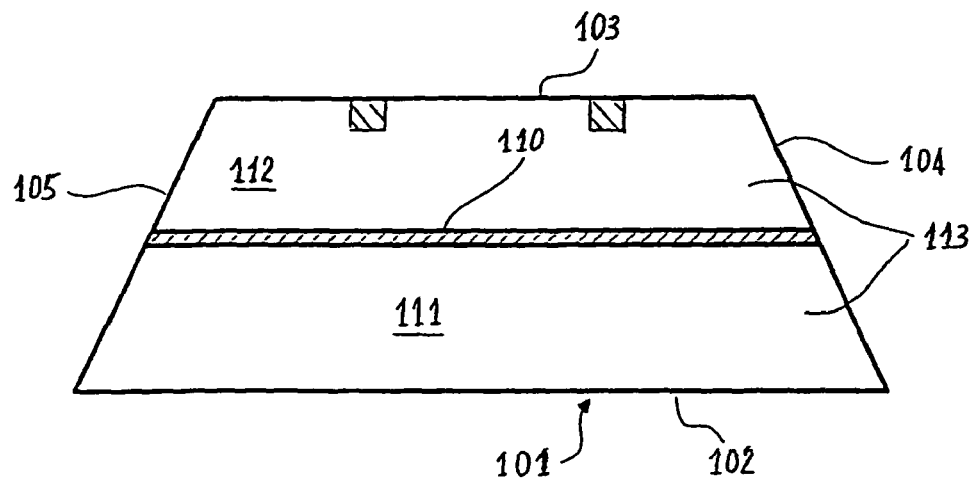
FIG. 4: Schematic radial cross-section of a tread according to another embodiment of the invention.

This control tread 101 is illustrated in FIG. 4 attached and is described in detail in the document of International patent WO-A-00/27655 (see pages 5 and 6 of that document in relation to FIG. 1 thereof). The numerical references in FIG. 1 of that document are used again, increased by 100, in FIG. 4 attached hereto.

Besides, the conducting axial layer 110 consists of the said conducting material with electrical resistivity close to $10^5$ Ω·cm, based on a S-SBR/BR blend (without added aromatic oil) and containing 60 phr of "N234" carbon black.

A set No. 3 of new control tyres, of size 175/70 R14, each having a tread 101 that differs from that of the said set No. 2 only in that it has, in addition, conducting films 114 respectively provided at the positions of the lateral faces 104 and 105 of the tread 101, and which are extended respectively over the outer face 103 of the said tread 101 by two peripheral circumferential strips 115, which are also conductive. These films 114 and strips consist of the same conducting material as that of the layer 110.

Figure 5:
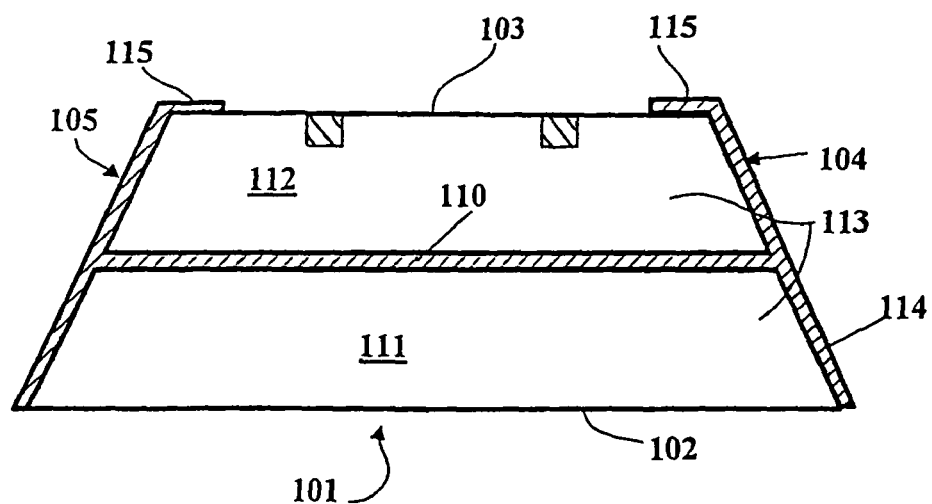
FIG. 5: Schematic radial cross-section of a tread according to a variant of FIG. 4.

This control tread 101 is illustrated in FIG. 5 attached, and is described in detail in the document of International patent WO-A-00/27655 (see page 7 of that document in relation to FIG. 2 thereof.

A set No. 4 of tyres according to the invention in the new condition, sized 175/170 R14, each having a tread 101 that differs from that of the said control set No. 2 only in that the axial conducting layer 110 consists of a mixture of the said insulating material "MI" and a conducting ionic solution containing lithium perchlorate (Li9ClO$_4$) as the ionic salt, polypropylene glycol carbonate (PGC) as the polar solvent, and a polyether of high inherent viscosity (between 4 and 8 dl/g) marketed under the name "ZNS 8100" by the company Nippon Zéon.

More precisely, this polyether comprises oxyethylene units in a mole fraction of 90% and oxypropylene units in a mole fraction of 10%, and has the following properties:

| | |
|---|---|
| Glass transition temperature | −55.4° C. |
| Melting point T$_m$ | 42.0° C. |
| Crystallinity | from 21 to 25% |

The composition of the said axial conducting layer 110 is as follows:

| | | | |
|---|---|---|---|
| S-SBR/BR blend | 100 phr | | |
| Added aromatic oil | 10 phr | | |
| ZEOSIL 1165 MP silica | 80 phr | | |
| Conducting solution | 60 phr of which | LiClO$_4$ | 18 phr |
| | | PGC | 11 phr |
| | | polyether | 40 phr |

Figure 6:
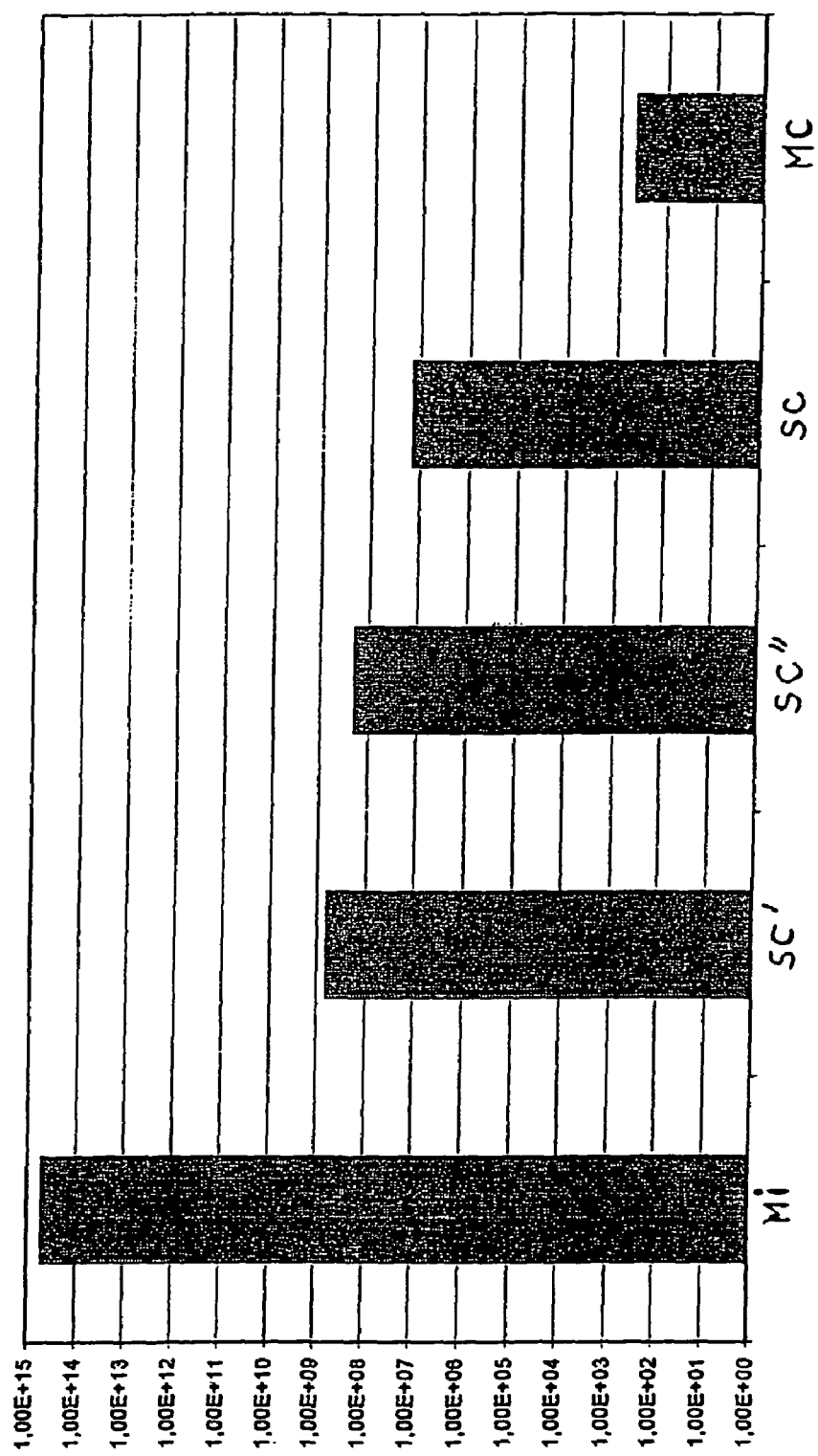
FIG. 6: Diagram illustrating the respective resistivities of an insulating rubber composition and other, more conductive or less conductive rubber compositions.

As can be seen in FIG. 6, the electrical resistivity of this conducting solution "SC" is between $10^7$ and $10^8$ Ω·cm.

FIG. 6 also shows that a conducting solution which consisted solely of the said polyether (solution SC') or of the said polyether associated with the said ionic salt (solution SC") would have a relatively low electrical resistivity of between $10^8$ and $10^9$ Ω·cm in these two variants.

A set No. 5 of tyres according to the invention in the new condition, sized 175/70 R14, each having a tread 101 which differs from that of the said set No. 4 according to the invention only in that the said conducting ionic solution contains zinc dichloride (ZnCl$_2$) as the ionic salt, the polyether and the polar solvent being unchanged. The composition of this axial conducting layer 110 is as follows:

| | | | |
|---|---|---|---|
| S-SBR/BR blend | 100 phr | | |
| Added aromatic oil | 10 phr | | |
| ZEOSIL 1165 MP silica | 80 phr | | |
| Conducting solution | 49.75 phr of which | ZnCl$_2$ | 11.5 phr |
| | | PGC | 8.25 phr |
| | | polyether | 30 phr. |

A set No. 6 of tyres according to the invention in the new condition, sized 175/70 R14, each having the said tread 1 obtained and provided in its bulk with the said conducting layers 6 of layered structure, obtained using the process of the invention (as indicated earlier, this tread consists of a mixture of about 90% of the insulating material "MI" and about 10% of a conductive material with resistivity close to $10^5$ Ω·cm, based on a S-SBR/BR blend and containing 60 phr of "N234" carbon black.

The results given below take into account the mean of five runs over the said manhole covers. They illustrate the noise levels due to radio interferences during these five runs, and are given relative to a reference base of 100 which corresponds to the mean from the runs with the said set No. 1 of control tyres. Results below 100 therefore indicate more moderate noise levels in the vehicle, i.e. less noticeable radio interferences.

| | |
|---|---|
| Control set No. 1 | 100 |
| Control set No. 2 | 45 |
| Control set No. 3 | 8 |
| Set No. 4 according to the invention | 24 |
| Set No. 5 according to the invention | 25 |
| Set No. 6 according to the invention | 3 |

These results show that a tread 101 according to the invention comprising an axial conducting layer 101 that contains an ionic solution based on the said polyether of high molecular mass and an ionic salt of a monovalent or divalent metal (sets Nos. 4 and 5 according to the invention with salts of Li and Zn respectively), allow a substantial reduction of the noise level of radio interferences compared with the level obtained with an axial conducting layer 110 containing carbon black (control set No. 2).

Moreover, a tread 1 according to the invention comprising the said conducting layers 6 of layered structure (set No. 6 according to the invention) allows a still greater reduction in the level of the radio interferences, even relative to a tread comprising lateral wings 114, 115 in addition to the conducting layer 110 (control set No. 3).

Note that the interference level obtained with this set No. 6 according to the invention is very close to that which characterises tyres with conductive treads (which contain mostly carbon black as the reinforcing filler).

For the second test series, the following sets of tyres were used:

A set No 1bis of control tyres corresponding to the said set No 1 of the first test series, except in that the tread of each tyre in set No. 1bis has a thickness reduced by half in the radial direction.

A set No. 3bis of control tyres corresponding to the said set No. 3 of the first test series, except in that the tread of each tyre in set No. 3bis has a thickness reduced by half in the radial direction.

A set No. 6bis of tyres according to the invention corresponding to the said set No. 6 of the first test series, except in that the tread of each tyre in set No. 6bis has a thickness reduced by half in the radial direction.

The results given below also take into account the mean of five runs over the said manhole covers. They illustrate the noise levels due to radio interferences during these five runs, and are given relative to a reference base of 100 which corresponds to the mean from the runs with the said set No. 1 of control tyres. Results below 100 therefore indicate more moderate noise levels in the vehicle, i.e. less noticeable radio interferences.

This second test series was carried out under the same meteorological conditions which, however, were different from those of the first test series (in particular, different humidity and temperature conditions). Consequently, the radio interference level values given below are not comparable with those of the first test series.

| | |
|---|---|
| Control set No. 1bis | 100 |
| Control set No. 3bis | 100 |
| Set 6bis according to the invention | 62 |

Note that for control sets Nos. 1bis and 3bis the scatter of the noise level values obtained was fairly high, ranging from 50 to 75%, while with set No. 6bis according to the invention, the scatter of the values was much less, being only of the order of 25%.

These results show that a tread 1 according to the invention comprising conducting layers 6 of layered structure (set No. 6bis of the invention) gives a significant reduction of the radio interference level even when the tread is half worn, compared with the level obtained with an insulating tread (control set No. 1bis), and this even relative to the level obtained with a tyre tread having lateral wings 114, 115 in addition to the conducting layer 110 (control set No. 3bis).

The tires of this set No. 6bis according to the invention thus provide a long-term solution, since the substantial reduction of radio interference they procure still persists even after a pronounced wear level of the tyres (tread worn to half-thickness). The information presented in FIGS. 7 and 8 corroborate these interference results.

Figure 7:
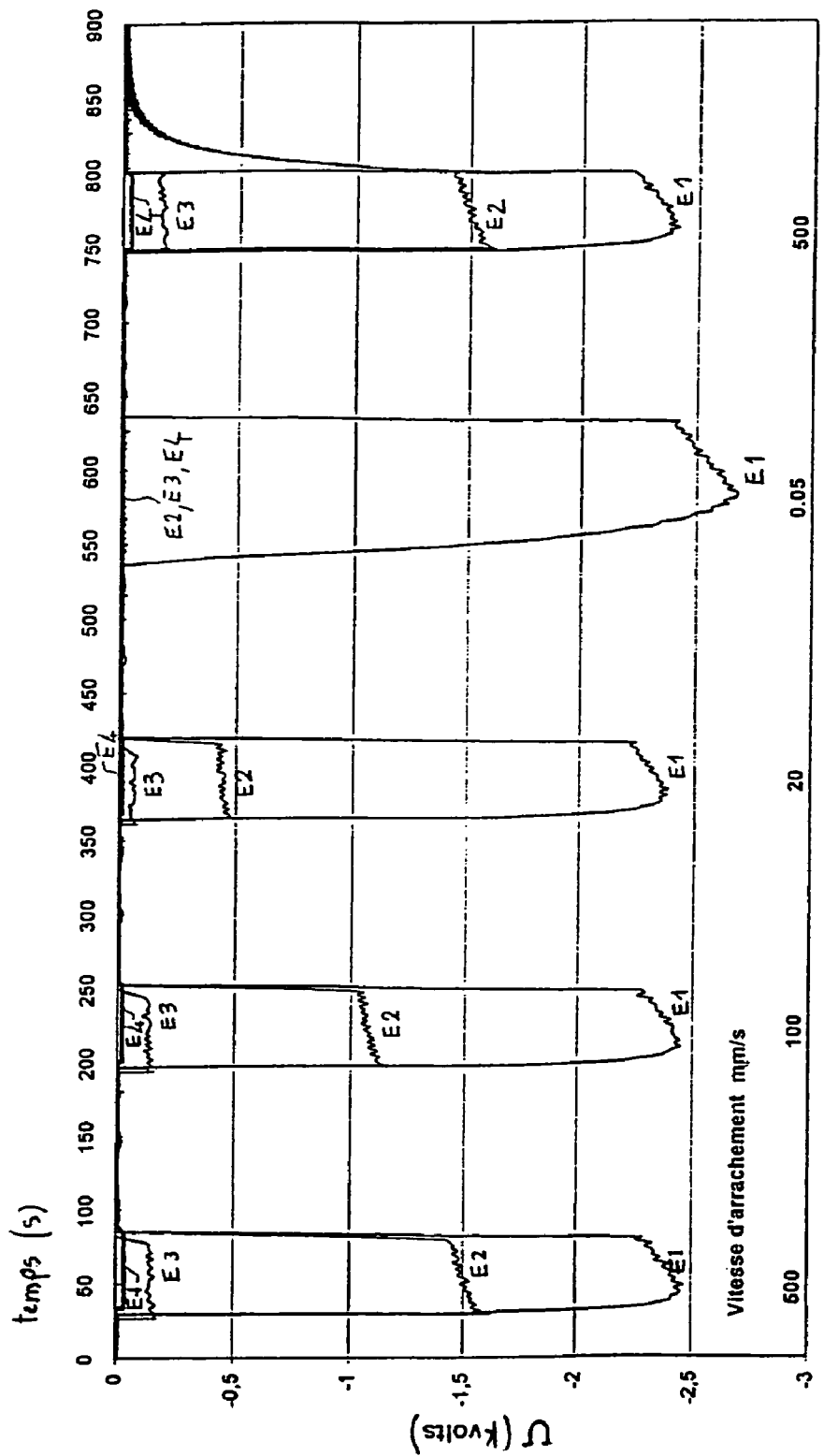
FIG. 7: Diagram illustrating the electrostatic discharge from rubber compositions that include the tread composition of FIG. 6, and FIG. 8: Diagram illustrating the times required for the electrostatic discharge of the rubber compositions of FIG. 7.

In effect, FIG. 7 shows electrostatic discharge measurements made with specimens consisting of rubber compositions essentially of the same type as those used in the aforesaid control treads and the treads according to the invention.

A first control specimen E1 consists of an insulating rubber mixture such as that used for the treads of the said control set No. 1.

A second specimen E2 consists of the insulating composition of E1 to which the said polyether denoted "ZNS 8100" was added, the latter being present in E2 in a mass fraction of 14%.

A third specimen E3 consists of a rubber composition of the type of that used for the conducting ionic solution in the treads of the said set No. 4 according to the invention, the mass fraction of "ZNS 8100" polyether in specimen E3 being 13% and that of the salt $LiClO_4$ being 6%.

A fourth specimen E4 consists of a rubber composition corresponding to the said insulating composition E1 to which an electrically conducting carbon black marketed by the company AKZO under the name "Ketjen" was added. The electrical resistivity of this specimen E4 is between $10^2$ and $10^3$ $\Omega \cdot cm$ (see conducting mixture "MC", FIG. 6).

Each specimen was placed end-on between two metal discs, and the charge taken up by the specimen when one of these discs was withdrawn at a variable speed was measured indirectly by measuring the potential difference U (the amount of charge Q on the specimen being related to its capacity C to accumulate static electricity by the relation $Q=C.U$).

The potential difference results obtained as a function of time and disc withdrawal speed (FIG. 7) show that the second specimen E2 including the said polyether accumulates less static electricity than the first, insulating control specimen E1. Nevertheless, at high withdrawal speeds (500 mm/s) it is evident that the quantity of charge on specimen E2 is relatively large (potential difference of around −1500 volts), and this represents a potentiality for electrostatic discharges that are significant in relation to on-board electronics, for example radio interferences.

In contrast to specimen E2, specimen E3 containing the said conducting ionic solution accumulates at the same withdrawal speed of 500 mm/s a very small amount of charge (about 10 times less compared with E2), which represents a potentiality for electrostatic discharges that are negligible in relation to on-board electronics.

Of course, specimen E4 has the highest electrical conductivity, but there is still some slight charge accumulation at high withdrawal speeds.

Figure 8:
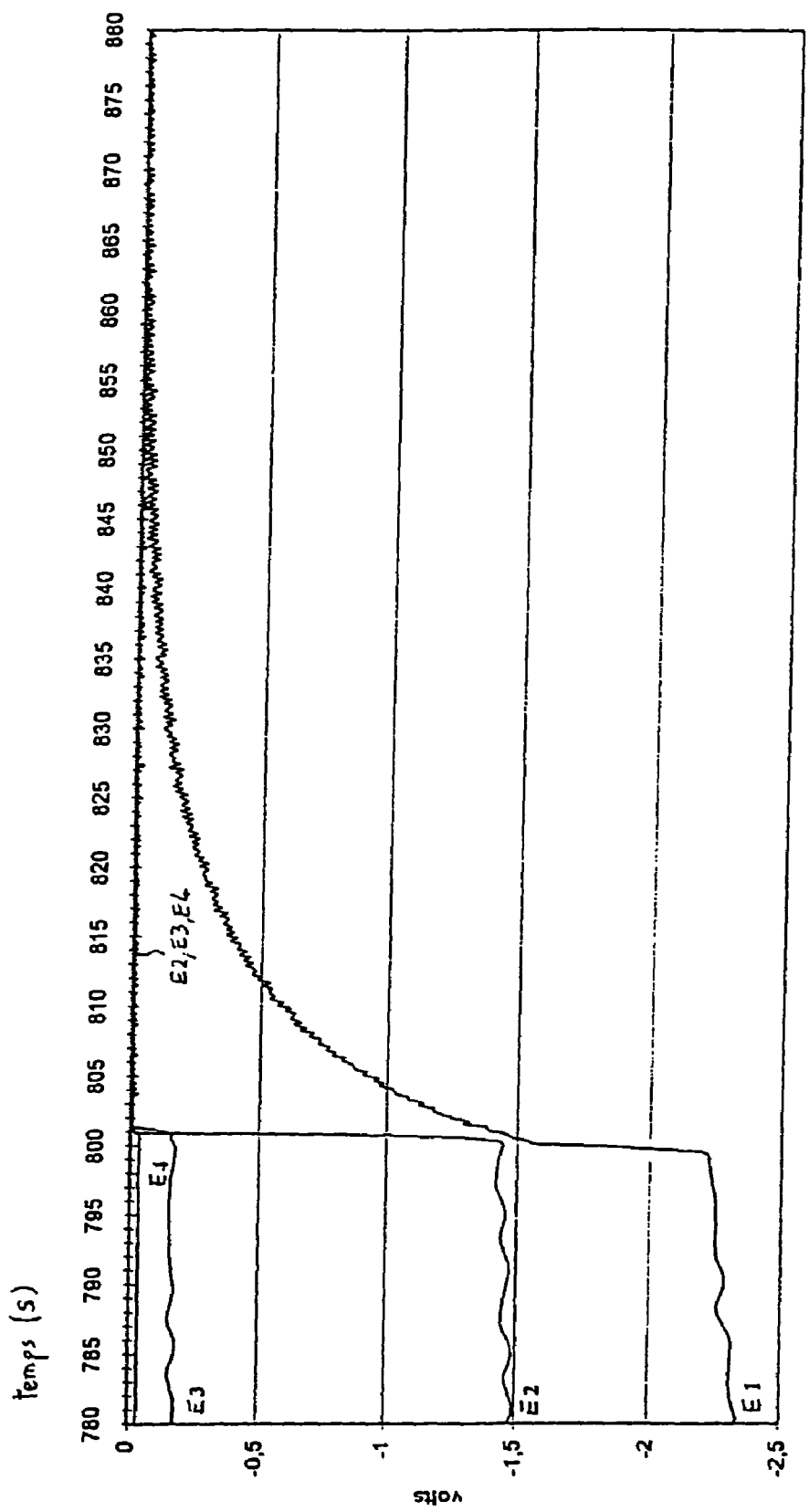

FIG. 8 shows the electrostatic discharge times of the various aforesaid specimens (still determined by measuring the potential difference U), as a continuation of the measurements corresponding to FIG. 7.

These results show that the control specimen E1 (insulating) is practically discharged only at the end of a time longer than one minute, whereas the other specimens E2, E3 and E4 are practically discharged in less than half a second despite their different charging capacities. The results indicate that these specimens E2, E3 and E4 would induce a total clearance of the electrostatic charge during the passage over a metallic plate or joint, of a vehicle whose tires comprised a tread based on any of those specimens.

Consequently, a compromise is needed between the properties of quantity of charge accumulated by the tread, and rate of electrostatic discharge.

It can be deduced from the results of FIGS. 7 and 8 that on its own, the presence of a polyether such as that mentioned earlier is enough to confer on the rubber composition containing it a ver short discharge time, which allows elimination of most of the electrostatic charge accumulated by a tire whose tread 101 comprises that composition, when it rolls over a metal plate or joint. The larger the amount of charge accumulated, the more of a nuisance it will be during a rapid discharge. It is therefore necessary to add to the composition a solvated metallic salt such as the aforesaid ionic salt, to avoid too great an accumulation of charge in the tread and hence interferences with the on-board electronics.

Note, besides, that the treads 1 and 101 according to the invention (incorporating an axial conducting layer 110 that contains the said ionic solution or else incorporating the conducting layers 6 of layered structure) confer on tires incorporating them a lower rolling resistance which is entirely analogous to that obtained with a conventional, insulating tread such as that of the said control set No. 1.

What is claimed is:

1. Process for obtaining an extruded profiled element based on a cross-linkable rubber composition, the profiled element being intended to constitute in the cross-linked condition a tread for a tyre and being delimited in width by two lateral faces which connect to one another radially inner and outer faces of the tread, conducting means being provided in the profiled element to connect the inner face electrically to the outer face between the lateral faces and all along the length of the profiled element, the remainder of the profiled element being based on an electrically insulating material, characterized in that the conducting means, viewed in a cross-section of the profiled element, have a layered structure comprising electrically conducting layers which are essentially concentric and have a curvature towards at least one of the inner and outer faces, and at least one of the layers emerges at the surface of the outer face; the conducting means comprising a rubber composition based on at least one diene elastomer comprising an inorganic reinforcing filler as reinforcing filler and a conducting ionic solution comprising:

a polyether which is a copolymer of oxyethylene and oxypropylene containing a majority of oxyethylene units, preferably in an amount between 20 and 50 phr (phr: parts by weight per 100 parts of the elastomer(s)), an ionic salt of a monovalent or divalent metal, such as lithium perchlorate or zinc dichloride, preferably in an amount between 5 and 30 phr, and a polar solvent, such as polypropylene glycol carbonate, preferably in an amount between 5 and 15 phr;

the process comprising the steps of:

A) introducing the electrically insulating material for a tread into an input of a main extruder which opens coaxially into an extrusion head, and introducing the electrically conducting material intended to constitute the conducting means having a layered structure into an input of at least one satellite extruder which opens radially upstream from the extrusion head inside the main extruder, B) propelling the insulating material and the conducting material within the extruders, C) producing, within the main extruder and upstream from the extrusion head, a uniformly distributed mixture of the insulating material and the conducting material, the mass fraction of the insulating material in the mixture being equal to or greater than 80% and that of the conducting material being less than or equal to 20%, and D) passing the mixture of step C into a channel of the extrusion head to obtain, at the outlet of an extrusion orifice of the extrusion head, the extruded and cross-linkable profiled element for a tread.

2. Process for obtaining an extruded profiled element according to claim 1, characterized in that the temperature inside each extruder is between 70° and 90° C.

3. Process for obtaining an extruded profiled element according to claim 1, characterized in that the absolute pressure inside the extrusion head is between 20 and 30 bars.

* * * * *